(No Model.)

H. CARMICHAEL.
LIFTING PUMP.

No. 431,686. Patented July 8, 1890.

Witnesses
Jas. J. Maloney
M. E. Hill

Inventor,
Henry Carmichael
by Jos. P. Livermore
Att'y

UNITED STATES PATENT OFFICE.

HENRY CARMICHAEL, OF MALDEN, MASSACHUSETTS, ASSIGNOR TO THE CUMBERLAND MANUFACTURING COMPANY, OF PORTLAND, MAINE.

LIFTING-PUMP.

SPECIFICATION forming part of Letters Patent No. 431,686, dated July 8, 1890.

Application filed February 17, 1890. Serial No. 340,712. (No model.)

*To all whom it may concern:*

Be it known that I, HENRY CARMICHAEL, of Malden, county of Middlesex, State of Massachusetts, have invented an Improvement in Lifting-Pumps, of which the following description, in connection with the accompanying drawings, is a specification, like letters on the drawings representing like parts.

My invention relates to a lifting-pump or liquid-transferring apparatus, the object being to produce a simple and reliable apparatus for raising liquids a comparatively small distance with the minimum expenditure of power and with certain and positive action and quantitative rate of delivery, the apparatus being without valves or other parts movable with relation to one another, and not involving the action of atmospheric pressure or suction in its operation.

The apparatus comprises a single rotating device, which may for simplicity be called a "wheel," having a series of ducts or passages extending from the hub or axis about which the wheel turns outward to the peripheral portion, which is partially immersed in the liquid to be raised. The ducts are so shaped that the liquid flows into the immersed portion and is then carried up by and into the ducts as the wheel rotates about a substantially horizontal axis, the said liquid finally passing out at or near the axis of the wheel through passages constituting integral continuations of said ducts extending along the said axis and constituting what may be called the "hub" portion of the wheel.

An apparatus of this kind is capable of giving an extremely uniform quantitative delivery proportional to its speed of rotation when taking its supply from a body of liquid that stands at a uniform level, and it is especially useful in cases where such definite quantity rate is to be maintained, and also where the liquid to be moved has a corrosive or destructive action on materials such as commonly used in pumps, for the reason that the ducts may be made from pipe or tubing of any suitable material, according to the nature of the liquid to be raised, and there need be no working parts exposed except these ducts, which may be maintained in fixed relation to one another. The wheel is provided with a shaft or journal which need not be exposed to the action of the liquid moved by the apparatus, and said shaft may be supported in any suitable bearings and rotated by any suitable actuating means.

Figure 1:
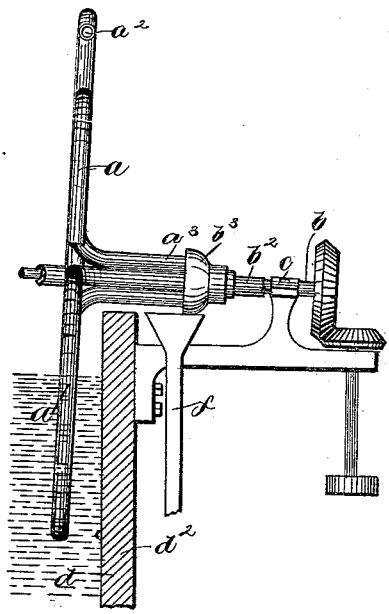
Figure 2:
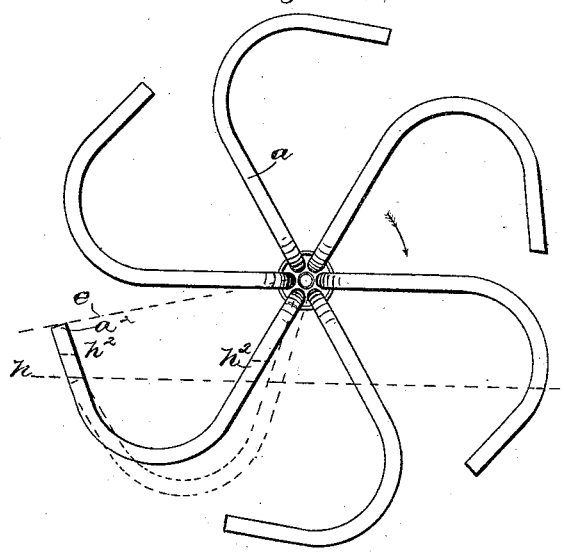
Figure 3:
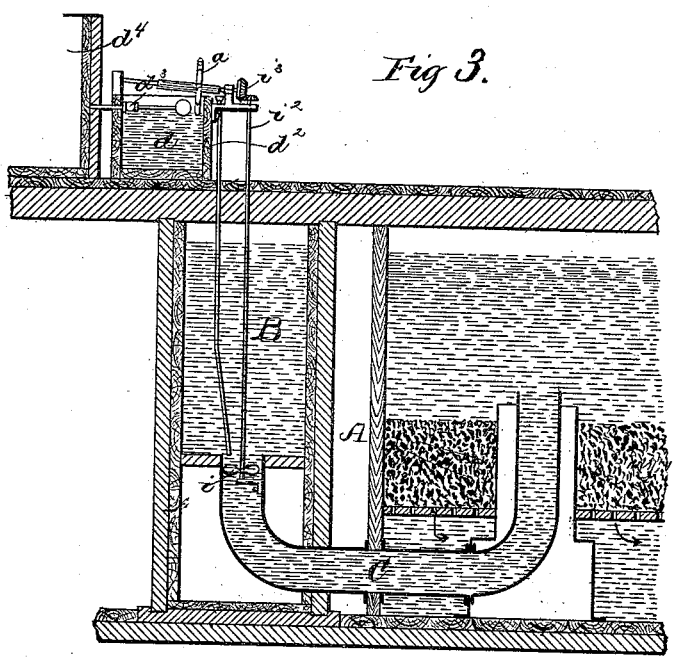

Figure 1 is a side elevation of a pump or liquid-raising apparatus embodying this invention; Fig. 2, a front elevation thereof; Fig. 3, a sectional view illustrating a pump embodying this invention employed in connection with a filtering apparatus.

The apparatus comprises a number of ducts or passages $a$, rigidly connected with a shaft $b$, mounted in suitable bearings, as indicated at $c$, and adapted to be rotated by any suitable or usual actuating means. The ducts $a$ radiate out from the axis and may be likened to the spokes of a wheel, which wheel, when in operation, turns upon a substantially horizontal or slightly-inclined axis, so that the wheel itself turns in a nearly vertical plane and has the lower portion of its periphery immersed in the liquid to be raised, the level of which is somewhat below the axis about which the wheel turns.

The apparatus is especially useful where liquids are to be raised only by a small height—as, for example, where a liquid is to be taken from a tank or reservoir, as $d$, and lifted over the wall $d^2$ of said reservoir and delivered at the outside of the same.

The said ducts $a$ are each made of a single piece of continuous tubing, and they are bent or offset between the central or hub portion and their open outer extremities $a^2$, so that the main body of the tube or duct between the axis and the outer end or inlet opening will be offset to one side of a straight line from the outer end to the axis—that is, the dotted line $e$, Fig. 2. Owing to this construction, when the wheel rotates in the direction of the arrow, Fig. 2, the open outer end $a^2$ of each tube will be immersed in the liquid, which will rise in said tube as the latter moves down through the liquid to the same level as the liquid outside, and the mouth of the tube will leave the liquid at a time when a considerable portion of the tube between the mouth and axis is still immersed in the liquid and filled with the same. One of the tubes is represented in dotted lines, Fig. 2, with its mouth just emerging from the liquid, the level of which is represented by the dotted lines $h$, and it will be readily understood that as the tube turns forward to the position shown in the full lines, with the mouth $a^2$ slightly above the level of the liquid, the amount of liquid which was in the tube when its mouth emerged from the water will have flowed back from the mouth $a^2$ and risen to a corresponding height toward the axis, so that it will stand in the tube up to the level indicated at $h^2$, and as the wheel continues to rotate the liquid contained in the tube will be raised bodily, but will at the same time flow from the outer end $a^2$ toward the end near the axis until finally it is raised above the level of the axis and flows by gravity into the central or hub portion of the tube which extends parallel with the axis, as shown at $a^3$, Fig. 1, to the point where it is desired to deliver the liquid from the wheel. The axial delivery portion $a^3$ is an integral continuation of the duct by which the liquid is lifted, as just described, there being an axial delivery portion to each lifting-duct. The delivery portions $a^3$ of the several ducts are grouped around the central shaft $b$, which may be incased in a tube $b^2$ of the same material as the ducts or of a material which will not be affected by the liquid to be raised, and said tube $b^2$ is provided with an annular deflector $b^3$, which receives the liquid flowing out from the delivery portions $a^3$ of the ducts and directs it into the passage $f$, through which the liquid is to be finally delivered.

An apparatus of this kind is especially useful for producing a uniform or measured discharge of the liquid over a barrier of moderate height—such, for example, as the partition-wall $d^2$—and has the advantage of being without valves or relatively-moving parts, so that it can be actuated by very small power, the only power required being what is necessary to overcome the friction at the bearings of the shaft $b$ and the actual lifting of the water from the level at which it stands in the reservoir up to the discharge level. These characteristics render it especially useful in an apparatus of the kind shown in Fig. 5, in which A represents a filter, which may be of usual construction; B, a flume or gallery, through which the liquid to be filtered is conducted to the filter, and C the actual inlet-pipe, by which the liquid is taken from the gallery B and delivered above the bed or filtering-surface of the filter A.

It is desirable in some cases to add small quantities of certain chemicals to the liquids to be filtered, and it is desirable that the quantities of said chemical agents should be in proportion to the quantity of liquid at any time passing through the filter. In filtering water, for example, it is sometimes necessary or desirable to add to it as it enters the filter a certain portion of alum solution for the precipitation and coagulation of impurities held in solution and in suspension in the water, and thus facilitate the removal of said materials, together with the coagulant from the water, by the mechanical action of the filter-bed. The pump $a$ (see Fig. 3) is especially useful for this purpose, and operates to take the solution of the chemical agents from the reservoir $d$, in which the said solution is maintained at a definite level by a ball-cock or float-valve $d^3$, controlling its admission to the reservoir $d$ from a larger reservoir $d^4$. The pump-wheel $a$ may then be actuated by a water-motor or current-wheel $i$, actuated by the current of liquid flowing into the pipe C and itself actuating the pump-wheel $a$ by any suitable mechanical connections—as, for example, the shaft $i^2$ and beveled gearing $i^3$—which transmits the power to the wheel $a$. Owing to the extremely small power that is required to turn the pump $a$, the movement of the current-wheel $i$ will respond with great delicacy to changes in the speed of the current, and as the quantity delivered by the pump $a$ is proportional to the rotary speed of said wheel up to a certain limit, which need never be passed in the operation of the apparatus, it follows that the quantity of alum solution or other chemical agent pumped from the reservoir $d$ by the wheel $a$ and delivered into the pipe C that supplies the filter will be directly proportional to the quantity of water that is at any time being filtered.

It is obvious that a single one of the ducts of the wheel $a$ would operate alone, and the invention is not limited to any definite number of ducts, although it is desired that there should be several uniformly arranged, so that the apparatus will be practically balanced so far as the weight of its own parts is concerned, and the only power or force required will be that for actually lifting the liquid to the desired height.

I claim—

The combination of a shaft with a number of ducts connected with said shaft, each having a delivery portion substantially parallel with the shaft and a bent portion extending outward from the shaft and terminating in an open mouth constituting the inlet to said duct, a non-corrosive shield inclosing the portion of said shaft exposed to the liquid delivered from the ducts, and a deflector adjacent to the delivery-orifices of said ducts, substantially as described.

In testimony whereof I have signed my name to this specification in the presence of two subscribing witnesses.

HENRY CARMICHAEL.

Witnesses:
FISKE WARREN,
JOS. P. LIVERMORE.